United States Patent [19]

Hama et al.

[11] Patent Number: 4,786,761
[45] Date of Patent: Nov. 22, 1988

[54] GAS INSULATED ELECTRICAL APPARATUS

[75] Inventors: Hiroyuki Hama; Hiroshi Yamamoto, both of Amagasaki, Japan

[73] Assignee: Mitsubishi Denki Kabushiki Kaisha, Japan

[21] Appl. No.: 67,125

[22] Filed: Jun. 29, 1987

[30] Foreign Application Priority Data

Jun. 30, 1986 [JP] Japan ............................ 61-153364

[51] Int. Cl.⁴ .............................................. H02G 5/06
[52] U.S. Cl. ..................................... 174/22 C; 174/28
[58] Field of Search ................... 174/21 C, 22 C, 28, 174/99 R, 99 B

[56] References Cited

U.S. PATENT DOCUMENTS 4,730,085 3/1988 Hama et al. ...................... 174/14 R

FOREIGN PATENT DOCUMENTS 2483695 12/1981 France .............................. 174/22 C
55-18840 2/1980 Japan ................................ 174/14 R Primary Examiner—Laramie E. Askin
Attorney, Agent, or Firm—Leydig, Voit & Mayer

[57] ABSTRACT

A gas insulated electrical apparatus comprises a hermetic sheath having a plurality of electrically conductive sheath sections each including flanged ends and a fastening device for fastening the flanged ends of the sheath sections together. A high voltage conductor is electrically insulatably supported within the sheath sections by an electrically insulating spacer which has a substantially uniform circumferential flange portion and is hermetically and securely held at the outer periphery thereof between the flanged ends of the sheath sections. An electrically insulating gas is disposed within the hermetic sheath. An electrically insulating member is interposed between at least one of the flanged ends of the sheath sections and the circumferential flange portion of the insulating spacer such that one portion of the electrically insulating member is exposed inwardly with respect to the hermetic sheath. The electrically insulating member is made of a material having a lower dielectric constant than the insulating spacer, thereby preventing the electric field from locally concentrating in the vicinity of a triple junction of the insulating gas, the flange and the insulating spacer, so that the flashover characteristics of the insulating spacer are improved.

5 Claims, 3 Drawing Sheets

GAS INSULATED ELECTRICAL APPARATUS

BACKGROUND OF THE INVENTION

The present invention relates to a gas insulated electrical apparatus, and more particularly to a gas insulated electrical apparatus including a sealing structure for moderating a local concentration of an electric field.

FIG. 1 illustrates, in section, one example of a conventional gas insulated electrical apparatus and FIG. 2 illustrates, in section, a sealing structure for hermetically sealing sheaths of the gas insulated electrical apparatus which is disclosed in Japanese Patent Laid-Open No. 55-18840.

Such a conventional gas insulated electrical apparatus comprises a grounded metallic hermetic sheath 1, a high voltage conductor 2 and an insulating spacer 3 for insulatably supporting the high voltage conductor 2 within the sheath 1. The hermetic sheath 1 comprises a plurality of sheath sections 1a hermetically connected to each other by means of sealing structures which will be described in more detail later. The high voltage conductors 2 each disposed within each section 1a of the sheath 1 are connected by connectors 4 having shields 5 for shielding each connector 4. An electrically insulating compressed gas 6 is confined within each section 1a of the divided metallic hermetic sheath 1.

The gas insulated electrical apparatus further comprises a plurality of sealing structures for hermetically connecting the divided metallic hermetic sheath sections 1a to each other. Each sealing structure comprises two flanges 8 integrally formed with the metallic sheath section 1a and a circumferential flange portion 3a of the insulating spacer 3. The flanges 8 and the circumferential flange portion 3a of the insulating spacer 3 have through holes formed in the axial direction thereof and a bolt 9 is inserted into the through holes and a nut 9a is screwed onto the bolt 9 for hermetically joining them.

On the side surfaces of each insulating spacer 3 where the flanges 8 come into contact therewith, there are provided annular grooves 10 for receiving O-rings 11 therein. When the flanges 8 and the insulating spacer 3 disposed between the flanges 8 are joined by the bolt 9 and the nut 9a, each of the metallic sheath sections 1a is hermetically sealed by the O-ring 11 received in each groove 10 to thereby confine the compressed gas 6 within each sheath section 1a.

However, the thus-constructed conventional sheath 1 has problems in that the electric field is locally concentrated in a triple-junction area 12 which is constituted by the insulating gas 6, the circumferential flange portion 3a of the insulating spacer 3 and the flanges 8 of the divided metallic sheath sections 1a.

SUMMARY OF THE INVENTION

Accordingly, an object of the present invention is to provide a gas insulated electrical apparatus having a sealing structure for preventing the electric field from locally concentrating in the triple-junction area inside of the metallic hermetic sheath.

With the above object in view, the gas insulated electrical apparatus of the present invention comprises a hermetic sheath having a plurality of electrically conductive sheath sections including a flanged end and fastening means for fastening the flanged ends of the sheath sections together. A high voltage conductor is electrically insulatably supported within the sheath by an electrically insulating spacer which is hermetically and securely held at its outer periphery between the flanged ends of the sheath sections. An electrically insulating gas is disposed within the hermetic sheath. An electrically insulating member is interposed between at least one of the flanged ends of the sheath sections and the circumferential flange portion of the insulating spacer such that one portion of the electrically insulating member is exposed inwardly with respect to the hermetic sheath. The electrically insulating member is provided for preventing the electric field from locally concentrating in the sheath.

BRIEF DESCRIPTION OF THE DRAWINGS

The present invention will become more readily apparent from the following detailed description of the preferred embodiments of the present invention taken in conjunction with the accompanying drawings, in which.

DETAILED DESCRIPTION OF THE PREFERRED EMBODIMENTS

Figure 1:
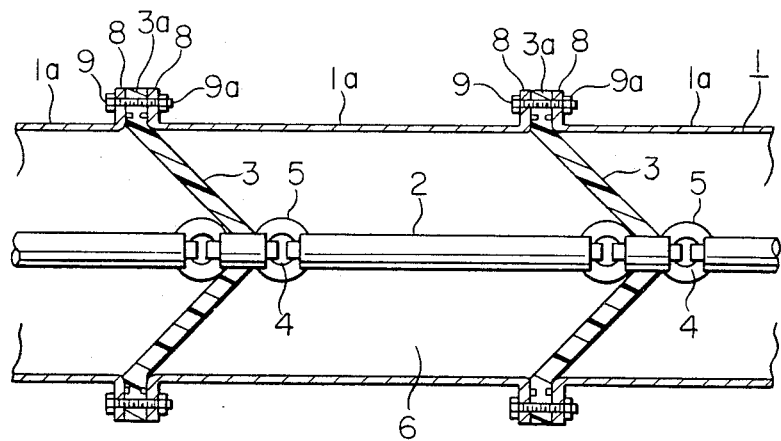
FIG. 1 is a longitudinal sectional view of a conventional gas insulated electrical apparatus.
Figure 2:
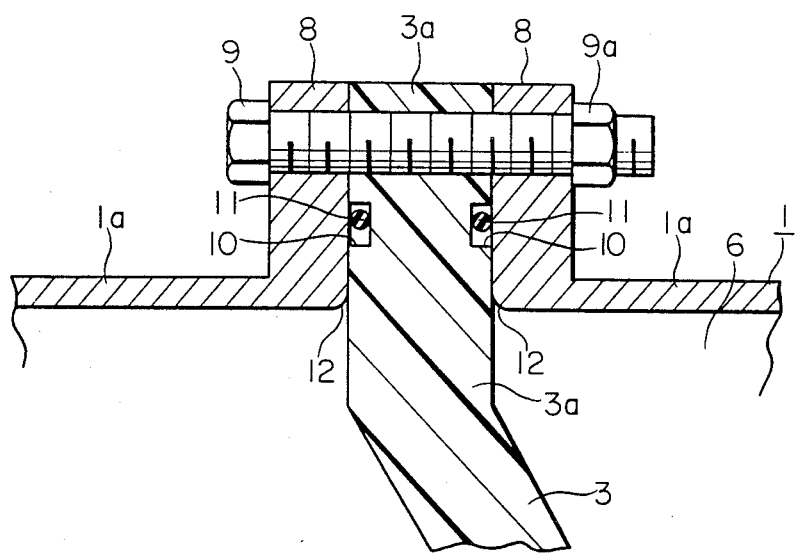
FIG. 2 is an enlarged sectional view showing a sealing structure for connecting sheath sections for use in the gas insulated electrical apparatus.
Figure 3:
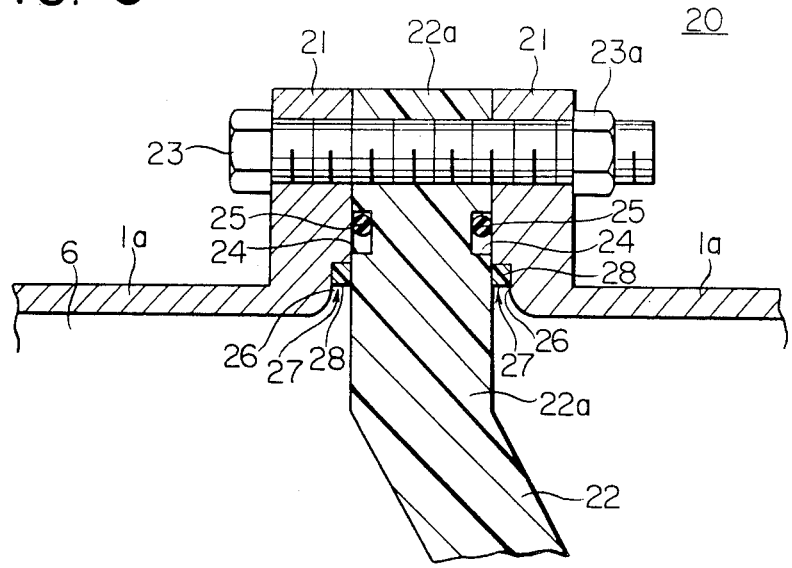
FIG. 3 is an enlarged sectional view of a sealing structure for hermetically connecting sheath sections according to an embodiment of the present invention.

FIG. 3 illustrates, in an enlarged sectional view, a sealing structure 20 for hermetically connecting sheath sections 1a of the metallic sheath 1.

The sealing structure 20 comprises flanges 21 integrally formed at both ends of each section 1a of the metallic hermetic sheath 1, and a circumferential flange portion 22a of an insulating spacer 22 which is sandwiched by the flanges 21. The flanges 21 and the circumferential flange portion 22a of the insulating spacer 22 have through holes formed in the axial direction thereof and a bolt 23 is inserted into the through holes for hermetically joining them with a nut 23a which is in engagement with the bolt 23.

The insulating spacer 22 has annular grooves 24 on both sides of the circumferential flange portion 22a thereof. Each of the annular grooves 24 receives a seal ring 25 therein through which each of the sheath sections 1a is hermetically sealed. Each of the flanges 21 has a notch 26 formed on an inner corner portion thereof facing the circumferential flange portion 22a, whereby a U-shaped annular groove 27 is formed between the flange 21 and the insulating spacer 22. The sealing structure 20 further comprises an insulating ring member 28 inserted into the U-shaped annular groove 27, the insulating ring member 28 having a dielectric constant which is lower than that of the insulating spacer 22.

With the sealing structure including the flanges 21, the insulating spacer 22 and the insulating ring member 28, one side of which is exposed inwardly with respect to the hermetic sheath 1a, the local concentration of the electric field can be moderated due to the lower dielectric constant of the insulating ring member 28, thereby allowing the flashover characteristics of the insulating spacer 22 to be improved.

Figure 4:
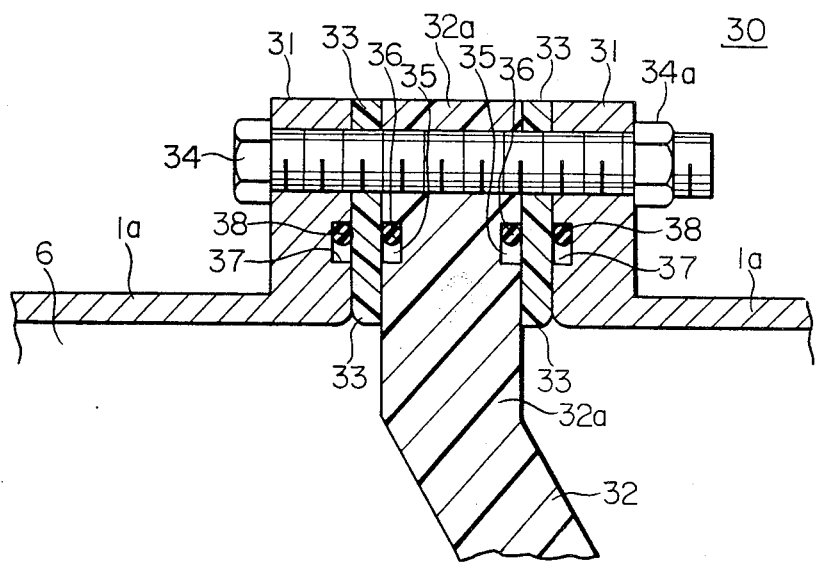
FIG. 4 is an enlarged sectional view of a sealing structure for connecting sheath sections according to another embodiment of the present invention.

In FIG. 4 in which another embodiment is illustrated, a sealing structure 30 comprises flanges 31, a circumferential flange portion 32a of an insulating spacer 32 and a pair of ring-shaped insulating members 33. The flanges 31, the circumferential flange portion 32a and the ring-shaped insulating members 33 have through holes formed in the axial direction thereof and a bolt 34 is inserted into the through holes for hermetically joining them with a nut 34a which is in engagement with the bolt 34.

The insulating spacer 32 is provided on both sides of the circumferential flange portion 32a with annular grooves 35 for receiving seal rings 36 therein. Each of the flanges 31 has an annular groove 37, on the side where the ring-shaped insulating member 33 comes into contact with the flange 31, for receiving seal rings 38 therein. Thus, each of the metallic sheaths 1a is hermetically sealed by the seal rings 36 and 38. The ring-shaped insulating members 33, which are respectively disposed such that one end thereof is exposed inwardly with respect to the hermetic sheath 1a, is made of an insulating material whose dielectric constant is lower than that of the insulating spacer 32, thereby allowing a local concentration of the electric field to be moderated around the insulating member 33.

Figure 5:
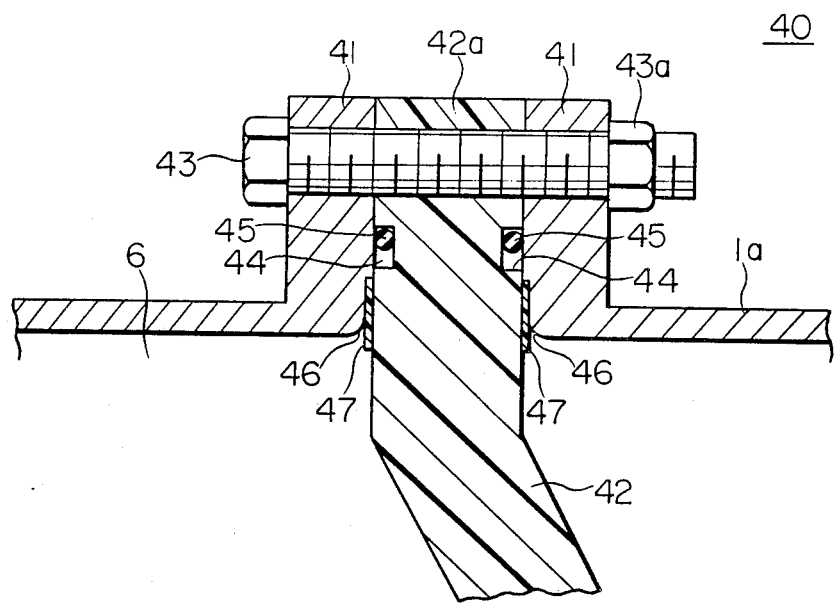
FIG. 5 is an enlarged sectional view of a sealing structure for connecting sheath sections according to still another embodiment of the present invention.

FIG. 5 shows still another embodiment of a sealing structure 40 which comprises a pair of flanges 41 and a circumferential flange portion 42a of an insulating spacer 42. The flanges 41 and the circumferential flange portion 42a have through holes formed in the axial direction thereof and a bolt 43 is inserted into the through holes for hermetically joining them with a nut 43a which is in engagement with the bolt 43. The circumferential flange portion 42a of the insulating spacer 42 is provided on both sides thereof where the flanges 41 come into contact with the flange portion 42a with a pair of annular grooves 44 for receiving seal rings 45 therein, thereby providing a completely sealed metallic sheath 1a. Each of the flanges 41 is provided with a groove 46 on the inner corner portion thereof facing the insulating spacer 42. The circumferential flange portion 42a has insulating coatings 47 disposed on both sides thereof facing the grooves 46. Each of the insulating coatings 47 has a lower dielectric constant than the insulating spacer 42 and is disposed such that one end side portion thereof is exposed inwardly with respect to the hermetic sheath 1a thereby moderating a local concentration of the electric field around the coating 47.

Figure 6:
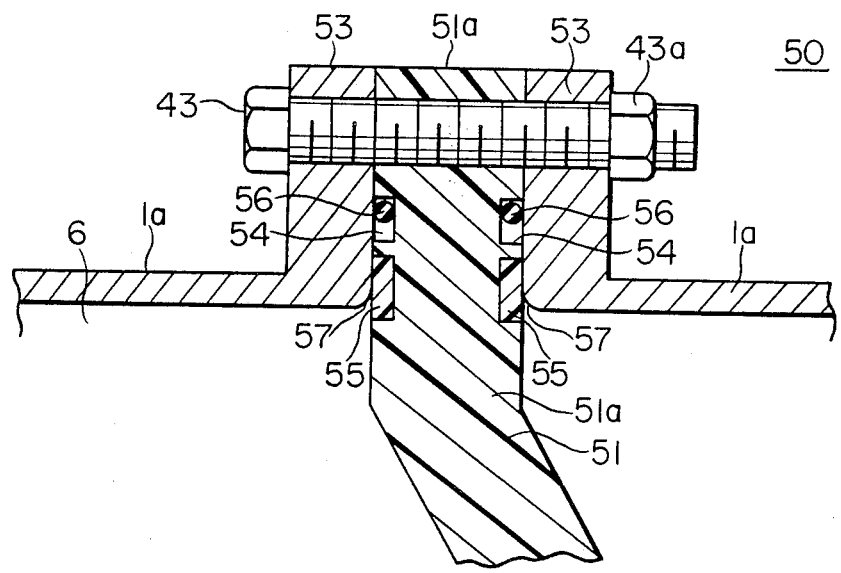
FIG. 6 is an enlarged sectional view of a sealing structure for connecting sheath sections according to still another embodiment of the present invention.

FIG. 6 shows still another embodiment of a sealing structure 50 which is substantially similar to the sealing structure 40 in FIG. 5, except for the arrangement of an insulating member 57.

A circumferential flange portion 51a of an insulating spacer 51 is provided with a first annular groove 54 and a second annular groove 55 on each side thereof where the flanges 53 come into contact with the flange portion 51a. The first annular groove 54 is coaxial with the second annular groove 55 and the first groove 54 is formed along the outer portion of the circumferential flange portion 51a relative to the second groove 55. The first groove 54 receives a seal ring 56 for hermetically sealing the metallic sheath 1a. An insulating member 57 is received in the second groove 55 in such a manner that one portion of the insulating member 57 is exposed inwardly with respect to the hermetic sheath 1a. The insulating member 57 is made of a material whose dielectric constant is lower than that of the insulating spacer 51, thereby preventing the electric field from locally concentrating around the insulating member 57, so that the flashover characteristics of the insulating spacer 51 are improved.

As can be seen from the above description, an insulating member of a relatively low dielectric constant material is provided between the circumferential flange portion of the insulating spacer and the flanges integrally formed with the metallic sheath sections, such that one portion of the insulating member is exposed inwardly with respect to the hermetic sheath 1a. In general, the electric field is locally concentrated around the triple-junction constituted by the insulating gas, the flange and the insulating spacer, in proportion to the fact that the dielectric constant of the insulating spacer is higher. According to the present invention, an insulating member of a relatively low dielectric material is disposed between the insulating spacer and the flange in the sealing structure such that one portion of the insulating member is exposed inwardly with respect to the hermetic sheath, thereby allowing a local concentration of the electric field to be reduced, so that the flashover characteristics of the insulating spacer are improved.

What is claimed is:

1. A gas insulated electrical apparatus comprising:
   a hermetic sheath having a plurality of electrically conductive sheath sections each including flanged ends;
   fastening means for fastening said flanged ends of said sheath sections together;
   a high voltage conductor disposed within said sheath;
   an electrically insulating spacer for electrically insulatably supporting said conductor relative to said sheath, said spacer being hermetically and securely held at the outer periphery thereof between said flanged ends of said sheath sections;
   an electrically insulating gas disposed within said sheath; and
   an electrically insulating member interposed between and separating at least one of said flanged ends of said sheath sections and a circumferential flange portion of said insulating spacer, a portion of said electrically insulating member being exposed inwardly with respect to said hermetic sheath and to the insulating gas disposed within said sheath, said insulating member being made of a material having a lower dielectric constant than said insulating spacer so as to reduce local concentration of the electric field developed at a junction between said flanged ends, said insulating gas, and said insulating spacer.

2. A gas insulated electrical apparatus as claimed in claim 1 wherein said insulating member comprises an annular ring member of dielectric material dimensioned to be received in a groove formed between said flanged ends of said metallic sheath and said insulating spacer and fitted within said groove.

3. A gas insulated electrical apparatus as claimed in claim 1 wherein said insulating member comprises a ring-shaped insulating member of dielectric material dimensioned to be sandwiched between said flange and said insulating spacer, said ring-shaped insulating member being interposed between the flange and the insulating spacer.

4. A gas insulated electrical apparatus as claimed in claim 1 wherein said insulating member comprises an insulating coating disposed on said circumferential flange portion of said insulating spacer.

5. A gas insulated electrical apparatus as claimed in claim 1 wherein said insulating member comprises an annular member received in a groove formed in said circumferential flange portion of said insulating spacer.

* * * * *